(12) United States Patent
Simon et al.

(10) Patent No.: US 7,747,750 B1
(45) Date of Patent: Jun. 29, 2010

(54) METHOD FOR RESERVING RESOURCES IN A STORAGE AREA NETWORK WITH SELECTIVE CAPABILITIES

(75) Inventors: Richard T. Simon, Brighton, MA (US); Andrew S. Becher, Rochester, MN (US); David Ohsie, Baltimore, MD (US)

(73) Assignee: EMC Corporation, Hopkinton, MA (US)

( * ) Notice: Subject to any disclaimer, the term of this patent is extended or adjusted under 35 U.S.C. 154(b) by 252 days.

(21) Appl. No.: 11/823,154

(22) Filed: Jun. 27, 2007

(51) Int. Cl.
*G06F 15/173* (2006.01)
*G06F 13/00* (2006.01)
(52) U.S. Cl. .................... 709/226; 711/150
(58) Field of Classification Search ........... 709/220, 709/224, 226; 711/150; 710/56
See application file for complete search history.

(56) References Cited

U.S. PATENT DOCUMENTS

2003/0093501 A1 * 5/2003 Carlson et al. ............. 709/220

* cited by examiner

*Primary Examiner*—Wing F Chan
*Assistant Examiner*—Nam Thai
(74) *Attorney, Agent, or Firm*—Krishnendu Gupta; Robert Kevin Perkins

(57) ABSTRACT

A method, system, and program product for reserving resources in a networked environment, e.g. a storage area network. A resource is some object that a user must use or change to complete a task. When a user plans a task, the user selects some high-level resources and properties to reserve and a Reservation Service embodiment creates reservations for them. Accordingly, the method system and program product embodiments overcome inefficiencies in reserving resources in a data storage environment while still allowing such reservations to occur. The method includes selectively reserving properties for resources from more than one available choice.

7 Claims, 7 Drawing Sheets

METHOD FOR RESERVING RESOURCES IN A STORAGE AREA NETWORK WITH SELECTIVE CAPABILITIES

RELATED APPLICATION

This application is a related to co-pending U.S. patent application Ser. No. 11/823,157 entitled "Method for Reserving Resources in a Storage Area Network by Reserving Portions of Properties of the Resources" filed on even date, and is assigned to EMC Corporation, the same assignee as this invention.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to data storage for users of computers, and more specifically to methods, systems, and a computer program product for reserving data storage resources in a data storage environment that may include a storage area network.

BACKGROUND OF THE INVENTION

Storage managers often update the configuration of a Storage Area Network (SAN) by defining new resources, removing old ones, changing the size or location of storage, and such activities. Because updates may overlap in time, may attempt to alter the same resources, or may rely on the states of resources for their success, the resources involved must be reserved so that no conflicts occur. However, reserving resources introduces inefficiencies in how resources are used. If an entire resource is reserved for a specific purpose, it is not available for use by other people, even though they may wish to use the resource in a way that does not conflict with the reservation. What is needed is an advancement in the art to overcome such inefficiencies, but while still allowing reservation of resources in a data storage environment, such as a SAN.

SUMMARY OF THE INVENTION

To overcome the problems and provide the advantages that have been described above, the present invention is a system, method, and program product for reserving a storage resource in a data storage environment.

In one embodiment the method includes the steps of, in response to receiving a host-generated request for resource reservation, selectively reserving any of the plurality of properties of the storage resource specified by a host-generated request, portions of any of the plurality of properties of the storage resource specified by the host-generated request, or all of the properties of the storage resource, for completing the host-generated request for resource reservation In an embodiment of a system comprising of a storage resource, a host, and a storage management station, the storage management station is for managing the storage resource and is capable of receiving the requests generated by the host for resource reservation. The storage management station has a CPU and memory configured with computer-executable program logic capable of performing steps similar or identical to those described above with reference to the embodiment of the method.

In another embodiment, a program product includes a computer-readable medium having program logic included on the medium configured to carry out computer-executed steps that are similar or identical to those described above with reference to the embodiment of the method.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

Figure 1:
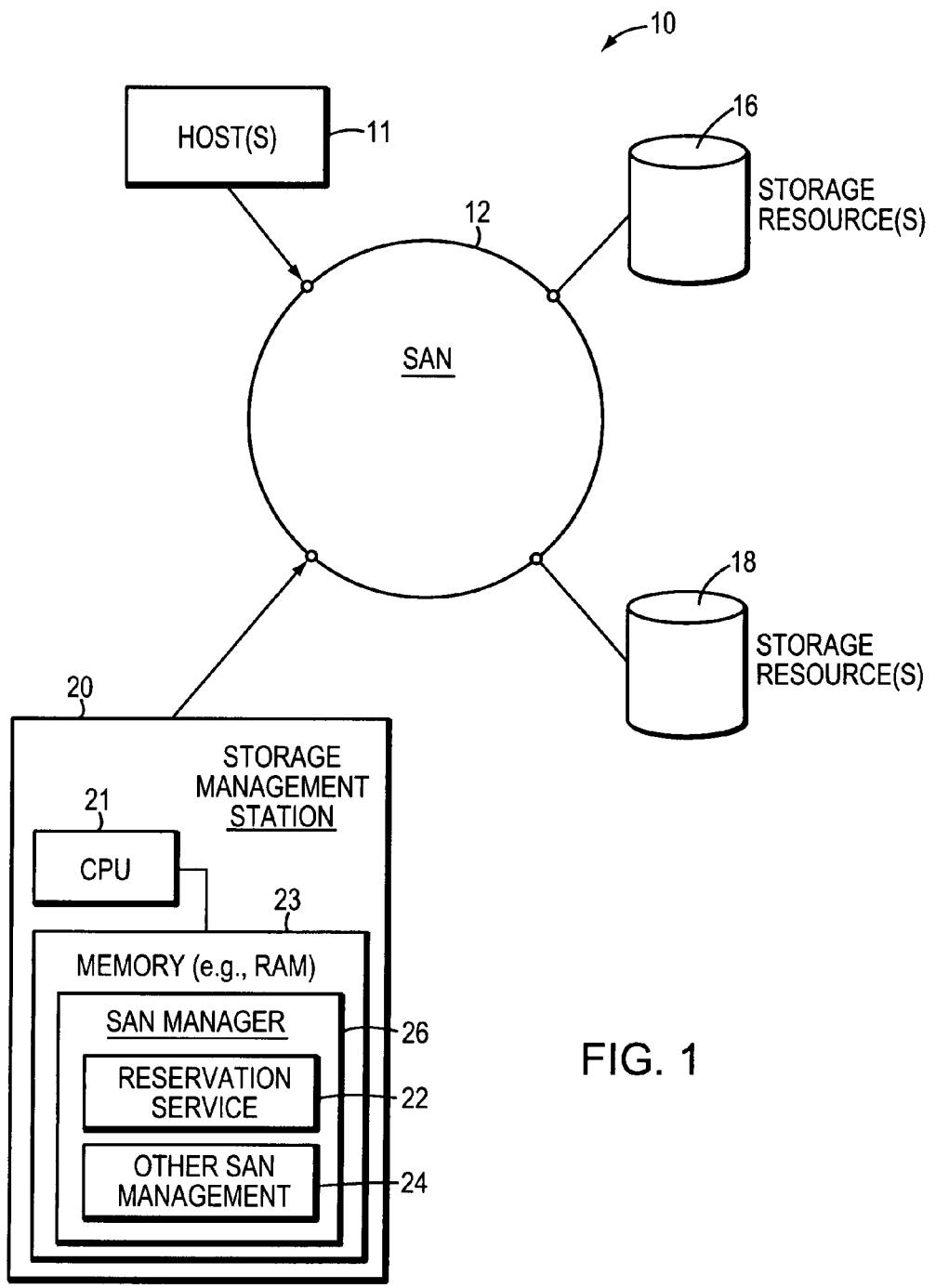
FIG. 1 shows a data storage environment including a reservation service and storage Resources which may be reserved by the service.

The inventors have critically recognized the need for reserving resources in a storage area network that is efficient and effective. However, one skilled in the art will recognize that the invention may broadly apply to other types of network topologies including resources available in a networked attached storage environment. Reservations are made on properties of resources by embodiments of the invention. A Resource is some object that the user must use or change to complete a task. When a user plans a task, the user selects some high-level resources and properties to reserve and a Reservation Service embodiment creates reservations for them. Accordingly, the broadest overview of the invention includes embodiments for overcoming inefficiencies in reserving resources in a data storage environment, such as a storage area network (SAN) while still allowing such reservations to occur.

The inventors have critically recognized a problem and this recognition in itself is an important part of their invention. For example, they have recognized that a storage manager may wish to allocate 20 GB on a storage device that has 50 GB free. But reserving the entire storage device for this purpose prevents a second person from allocating another 20 GB on the same device, even though that second allocation would not interfere with the first one.

The inventors have recognized that having more granularity in making reservations will permit greater flexibility and concurrency in using resources. An important purpose of a reservation is to preserve properties of a resource so that the assumptions made at the time of reservation do not become invalid. The simplest approach is to require a resource remain unchanged until the reservation is released (or expires), which is equivalent to reserving all properties of a Resource.

A more general approach is to reserve specific properties of a Resource. When a user requests a reservation, specific properties of each Resource are selected that must be preserved. Preserving one property leaves other properties available for reservation by other potential reservation holders. In addition to reserving specific properties, a reservation can apply to a portion of a property. So, the inventors have recognized that the storage manager could use embodiments of the invention to reserve just 20 GB of the available 50 GB of the available space property, leaving the remaining 30 GB available for other uses. In other words, the reserved property is allowed to change as long as that change does not conflict with any other reservations. In the example, the value of the available space property may change as long as it does not go below 20 GB, because that would violate the reservation. If another storage manager reserves 20 GB, then the available space may change as long as 40 GB is left. Allowing a reserved property to change applies to other kinds of properties, for instance properties whose values are states, such as on-line, off-line, etc. In this case, the reservation holder may say what states the property may take on without invalidating the reservation.

The reservation service embodied in this invention increases the concurrent use of valuable Resources by allowing: reserved properties to change within acceptable limits; more than one reservation on a Resource for different properties; and portions of properties to be reserved, leaving the unreserved portion available for other reservations.

Figure 2:
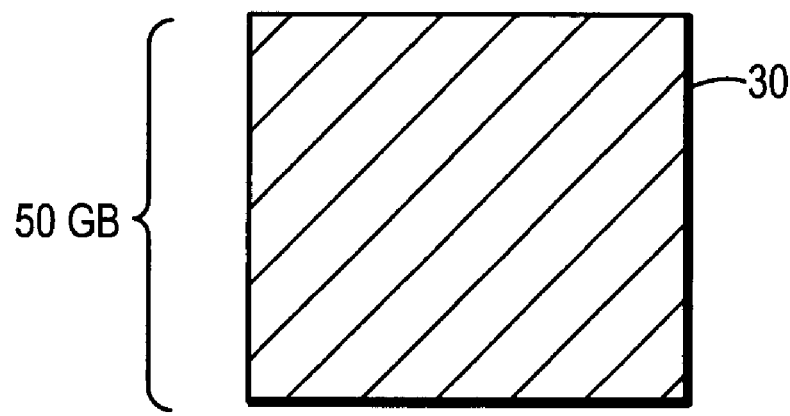
FIG. 2 shows all properties of a Resource that may be reserved with the reservation service of FIG. 1.
Figure 3:
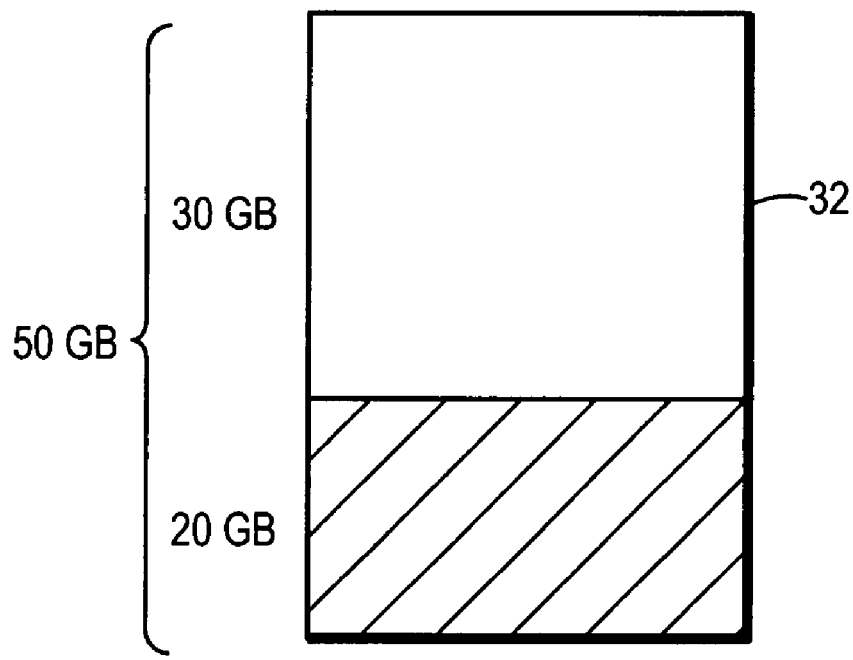
FIG. 3 shows selected properties of a Resource that may be reserved with the reservation service of FIG. 1.
Figure 4:
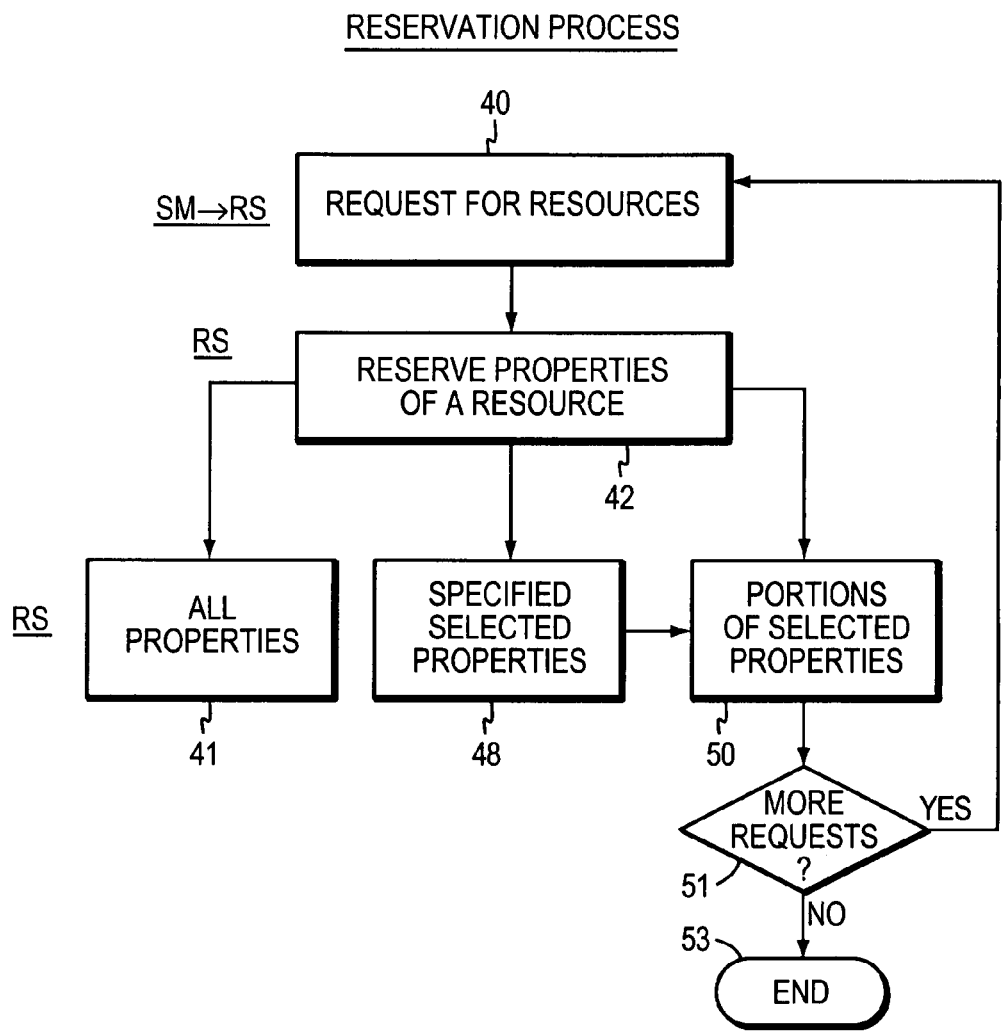
FIG. 4 shows an overview of an embodiment of a reservation process executed by the reservation service of FIG. 1.
Figure 5:
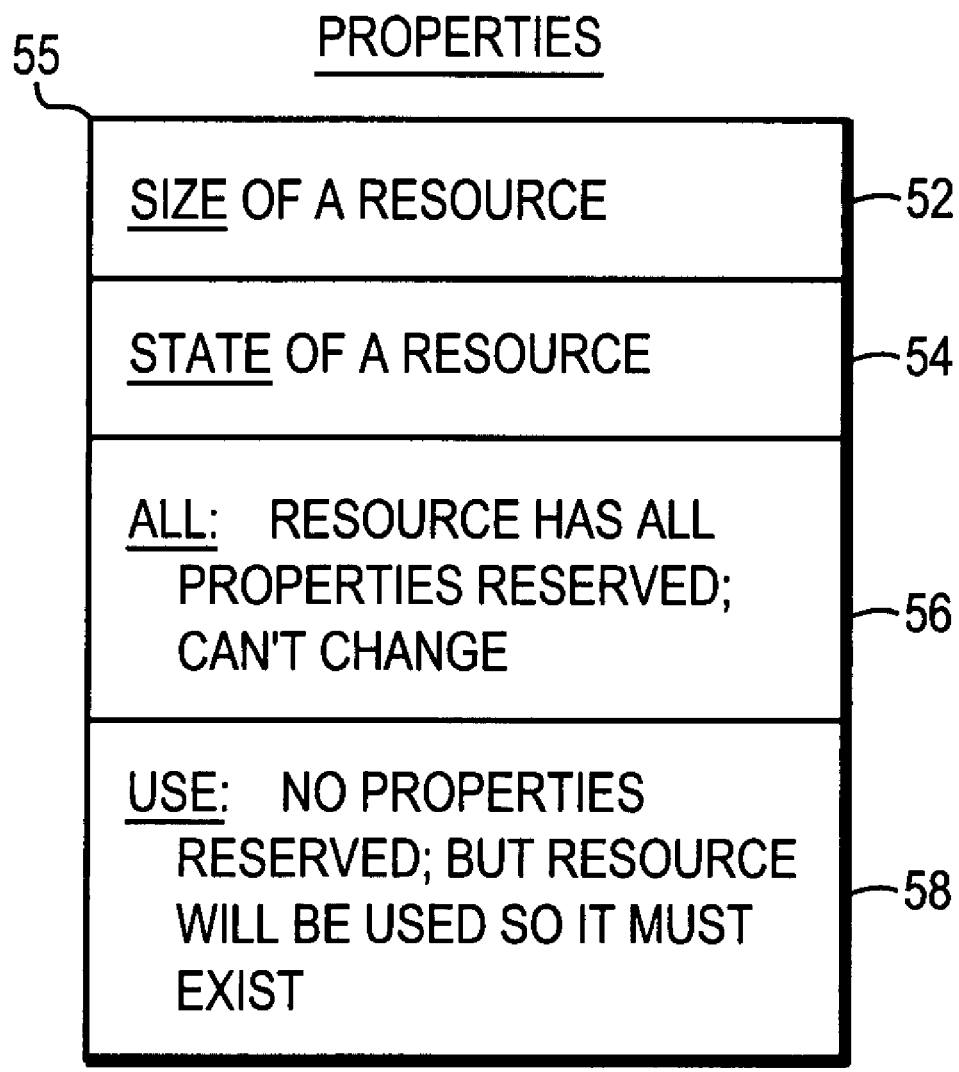
FIG. 5 shows details of properties of a Resource that may be reserved with the reservation service of FIG. 1.
Figure 6:
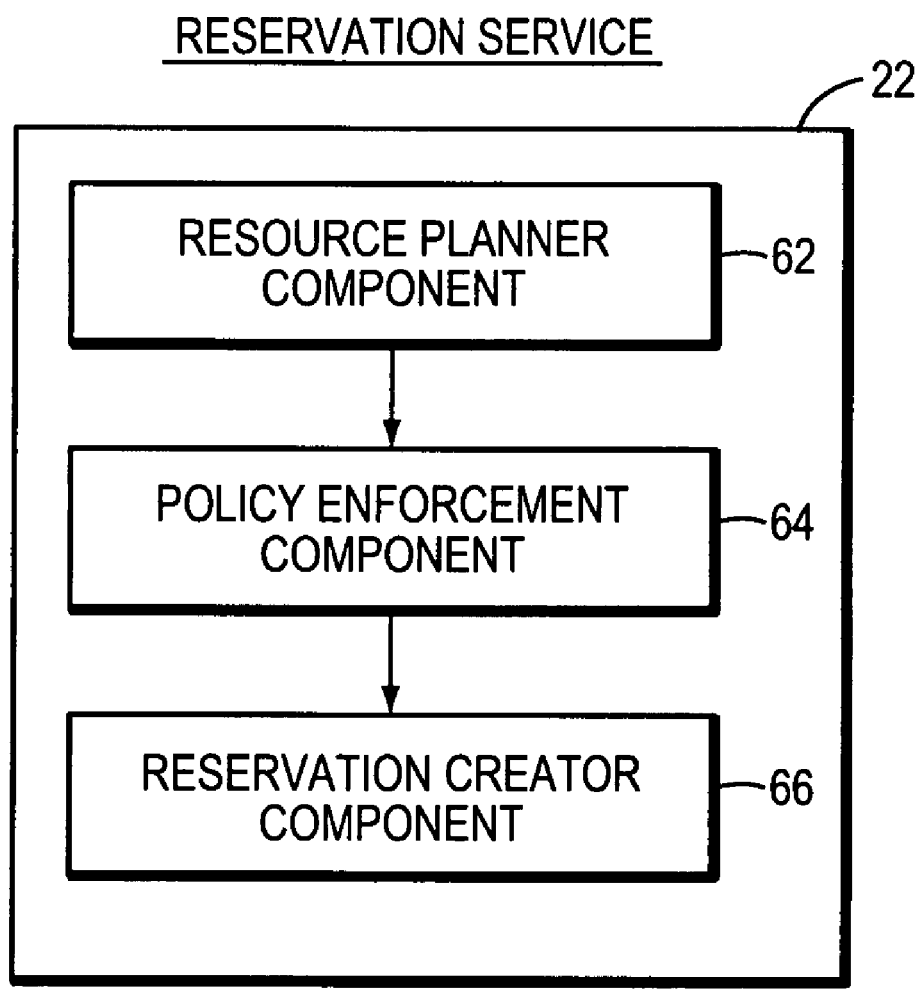
FIG. 6 shows components of the reservation service of FIG. 1.

FIG. 1 shows a Data Storage Environment 10 including a Reservation Service 22 and Storage Resources 16 and 18 which have Properties that may be reserved by the Service 22 in accordance with the process embodiments below. Examples of such Properties for Resources that may be reserved are shown in FIGS. 2-3, and 5. An overview of an embodiment of a reservation process is shown in FIG. 4. Components of the Reservation Service 22 are shown in FIG. 6.

Referring again to FIG. 1, Storage Management Station 20 in a preferred embodiment is of the architecture of a general digital computer including a conventional central processing unit (CPU) 21 and electronic memory (e.g., random access memory or RAM) 23. However, when the memory is loaded with special code including SAN Manager 26, which includes the Reservation Service 22 and other SAN Management code 24, it becomes a special purpose digital computer, enabled, among other things, for SAN Management functions include reserving Storage Resource(s) and their Properties in the SAN 12. Such Resources may be reserved for applications running on Host(s) computer(s) 11. It should be noted that although only two Resources and one host are depicted in FIG. 1, this is for the sake of simplicity and there might be other numbers of such Resources or hosts communicating with the Storage Management Station over the SAN, including one Resource or a plurality of hosts.

FIGS. 2-3 show Properties of a Resource that may be reserved with the Reservation Service 22 (FIG. 1). All of the Storage capacity or 50 GB of a Storage Resource 30 may be reserved (FIG. 2), or alternatively 20 GB of 50 GB of a similar Storage Resource 32 may be reserved (FIG. 3).

FIG. 4 shows an overview of an embodiment of reservation process executed by the Reservation Service 22 (FIG. 1). Requests for Storage Resources are passed by the SAN Manager (SM) 26 to its component the Reservation Service (RS) 22 for handling in Step 40. The RS 22 reserves Properties of a Storage Resource in Step 42. It may reserve all of a Property (e.g., all the storage capacity as shown in FIG. 2) in Step 41, or it may reserve only specified selected properties (e.g., only a portion of a property such as less than all the storage capacity as shown in FIG. 3) in Step 48. RS 22 may also reserve other Properties of the same resource, e.g., its state or its connectedness with other resources. Portions of selected Properties can be selected by RS 22 in Step 50. If there are more requests for Resources, then processing flows to Step 40. If not, then processing of the Reservation Process ends in Step 53.

FIG. 5 shows details of Properties of a Resource that may be reserved with the Reservation Service 22 (FIG. 1). Size of a resource is a Resource Property 52 that may be reserved, which is what has been shown, for example, in FIGS. 2-3. State of a Resource may also be reserved as Property 54. Reserving the All Property 56 means that all properties of a resource are reserved and the resource may not be changed. Use Property 58 indicates that no properties are reserved, but since it may be used it must exist.

FIG. 6 shows components of the Reservation Service 22, it includes a Resource Planner Component 62, a Policy Enforcement Component 64, and a Reservation Creator Component 66. The Resource Planner Component provides an interface to query existing reservations. Queries may be provided for: all reservations; reservations for a given task; reservations for a given resource or property; and reservations for a given user. There are at least two kinds of reservations: software reservations and hardware reservations. Both of these kinds are persisted by the Reservation Service. Software reservations are maintained only by software. Hardware reservations are used for resources that provide some hardware support for reserving the resource. Policy Enforcement is used to enforce rules related to reservations, and the Reservation Creation Component is used for affecting reservations, such as making and canceling reservations.

Figure 7:
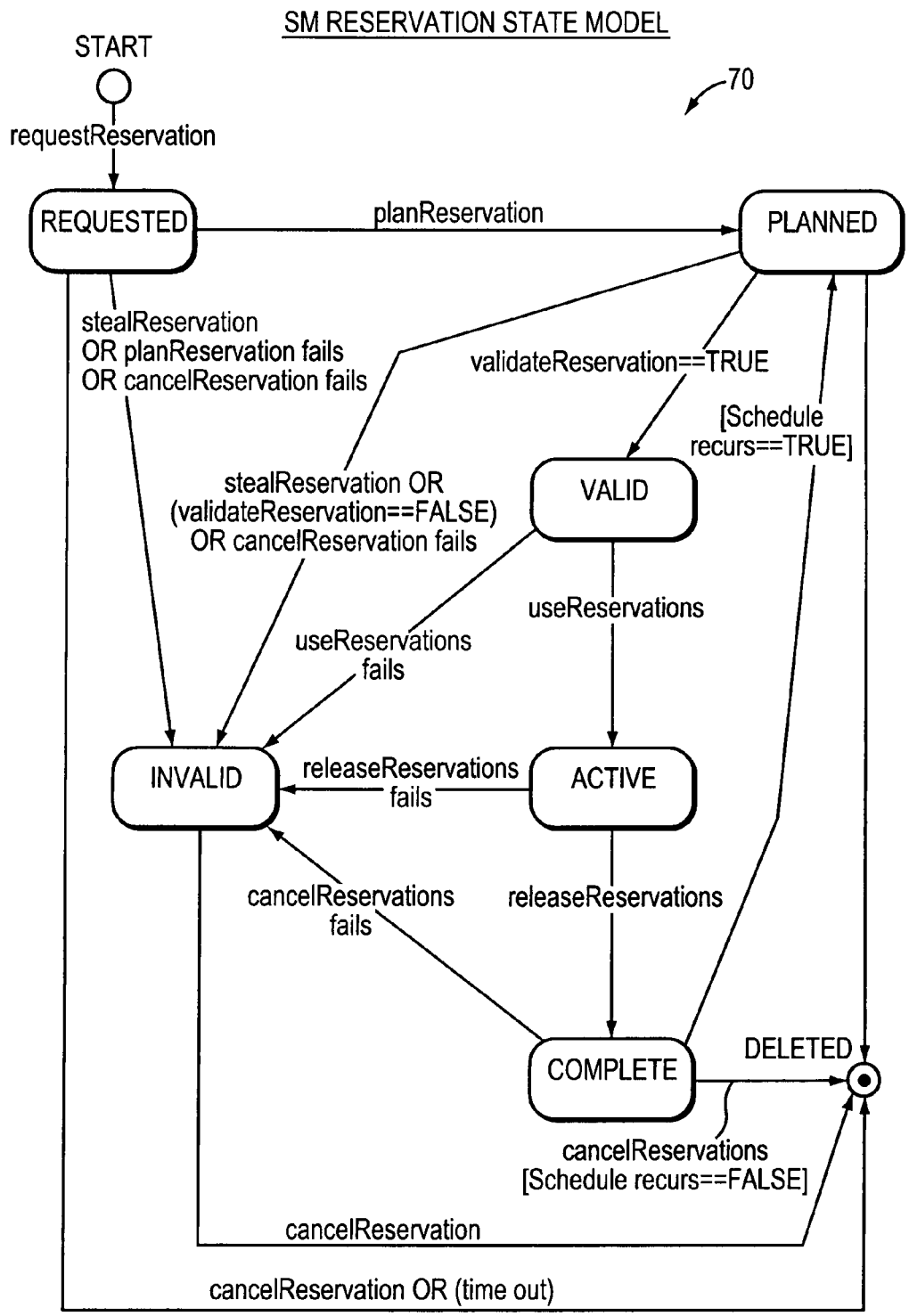
FIG. 7 shows a state model for reservations carried out by the reservation service of FIG. 1.

FIG. 7 shows a state model 70 for reservations carried out by the Reservation Service 22 (FIG. 1). Reservations go through a series of states as they are created and used. A user enters a planning application and selects a template task or, perhaps, starts from scratch. The user specifies a set of criteria to use to find suitable candidate resources for the task. Through the planning application, the user selects a specific resource or a resource property from a list of resources or properties meeting the user's criteria, and supplies the following information: the resource to be reserved; the property of the resource to be reserved; limits on the allowed changes to the property. If the value of the property changes outside these limits, then the task cannot succeed. The user also may make an indication of how the property will be changed by the task that will use the reservation.

Referring to FIG. 7, the Reservation Service creates a reservation for the resource (property) in the REQUESTED state, which is invoked by a requestReservation command. The reservation includes the resource ID, property ID, change limits, change indication, and user ID. A user finalizes the Plan and submits it for execution with a planReservation command. The reservations associated with the Plan enter the PLANNED state. Planned reservations include the Reservation Holder, which is a reference to the entity that owns the reservation. PLANNED state reservations do not time out. The reservations are validated before execution begins to make sure they are still in the VALID state. If a reservation fails validation, acted out by the useReservation fails command, then it enters the INVALID state. Otherwise it is VALID.

A reservation may also enter the INVALID state if the reservation is stolen by another user with appropriate authorization through a stealReservation command. If a reservation is stolen, the old reservation becomes INVALID, and a new Requested reservation is made for the new owner. Other ways a reservation becomes INVALID include the failure of planReservation or cancelReservation commands. Also it is INVALID if validateReservation is False.

When the task executes, the reservations for the task enter the ACTIVE state. Reservations in this state cannot be stolen or canceled. When the task is done, the reservations enter the COMPLETE state. The releaseReservation command may be used for the transition from ACTIVE to COMPLETE state. If the task's schedule is recurring, the reservation may then return to the PLANNED state. The Schedule recurs is True command can be invoked to indicate this. If the schedule does not recur, the reservation is deleted, and Schedule recurs is False, A reservation will enter the INVALID state any time an error occurs during the processing of the reservation. There are two kinds of possible errors: validation errors that occur when validateReservation fails or is False because the resource is not available or the property has changed outside the required limits, and transition errors that occur when the transition from one state to another fails, which occurs when the Reservation Service fails to operate on a reservation. The releaseReservation fails command may be used for indicating the latter has occurred.

Figure 8:
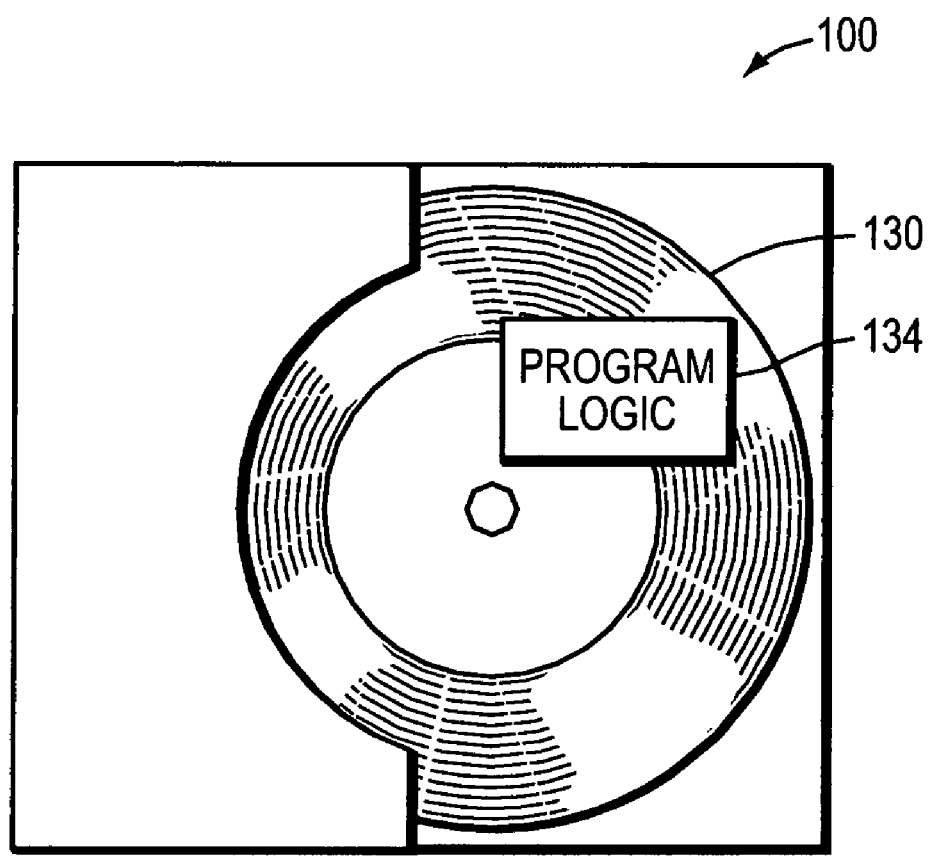
FIG. 8 shows a computer-readable medium encoded for computer-execution of the reservation process embodiment of FIG. 4.

FIG. 8 shows Program Logic 134 embodied on a computer-readable medium 130 as shown, and wherein the Logic is encoded in computer-executable code configured for carrying out the reservation service process of this invention and thereby forming a Computer Program Product 100. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, for example the storage management station of FIG. 1 including CPU 21 and Memory 23 the machine becomes an apparatus for practicing the invention. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for reserving a storage resource in a data storage environment the storage resource being managed by a storage management station capable of receiving requests generated by a host for resource reservation, the storage resource having a plurality of properties, the storage management station having a memory and a CPU for executing computer-executed steps, the method comprising the computer-executed steps of:

in response to receiving a host-generated request for storage resource reservation, reserving any portion or all of the capacity of the storage resource specified without configuring or otherwise changing the storage resource, and also reserving other properties of the storage resource such as its state or connectedness with other resources while allowing the resource to be used by users not reserving it as long as the use does not conflict with the reservation;

further comprising invalidating the resource reservation made at the step of reserving if the state property indicates the resource reservation has been stolen by a subsequent authorized request.

2. The method of claim 1 further comprising enforcing rules related to the host-generated request for resource reservation.

3. The method of claim 2 further comprising querying for existing reservations on the storage resource before the step of reserving.

4. The method of claim 3, wherein the storage management station includes program logic operating in the memory and being executed by the CPU, the program logic having a reservation service for performing the steps of querying for existing reservations on the storage resource, enforcing rules related to the host-generated request for resource reservation, and affecting reservations on the storage resource in response to the host-generated request.

5. A system for reserving storage resources in a data storage environment, the system comprising:

a storage resource, having a plurality of properties;

a host, capable of generating requests for reserving the storage resource; and a storage management station for managing the storage resource and capable of receiving the requests generated by the host for resource reservation, the storage management station having a memory and a CPU, the memory having a program logic operating therein configured for carrying out the following computer-executed steps:

in response to receiving a host-generated request for storage resource reservation, reserving any portion or all of the capacity of the storage resource specified without configuring or otherwise changing the storage resource, and also reserving other properties of the storage resource such as its state or connectedness with other resources while allowing the resource to be used by users not reserving it as long as the use does not conflict with the reservation;

further comprising invalidating the resource reservation made at the step of reserving if the state property indicates the resource reservation has been stolen by a subsequent authorized request.

6. The system of claim 5, wherein the program logic of the storage management station has a reservation service that includes:

a resource planner component, for providing an interface to query existing reservations on the storage resource;

a policy enforcement component, for enforcing rules related to the host-generated request for resource reservation; and a reservation creator component, for affecting reservations on the storage resource in response to the host-generated request.

7. A program product for reserving a storage resource in a data storage environment, the storage resource being managed by a storage management station capable of receiving requests generated by a host for resource reservation, the storage resource having a plurality of properties, the program product including a computer-readable non-transitory medium encoded with program logic configured for carrying out the following computer-executed steps:

in response to receiving a host-generated request for storage resource reservation, reserving any portion or all of the capacity of the storage resource specified without configuring or otherwise changing the storage resource, and also reserving other properties of the storage resource such as its state or connectedness with other resources while allowing the resource to be used by users not reserving it as long as the use does not conflict with the reservation;

further comprising invalidating the resource reservation made at the step of reserving if the state property indicates the resource reservation has been stolen by a subsequent authorized request.

\* \* \* \* \*